United States Patent
Hunt et al.

(10) Patent No.: US 11,762,109 B2
(45) Date of Patent: Sep. 19, 2023

(54) SCINTILLATION DETECTORS AND METHODS OF PREPARATION AND USE THEREOF

(71) Applicant: Corvid Technologies LLC, Mooresville, NC (US)

(72) Inventors: Sean Matthew Hunt, Cary, NC (US); Stephen Michael Daigle, Davidson, NC (US); Kristopher Reidar Vorren, Mooresville, NC (US)

(73) Assignee: Corvid Technologies LLC, Mooresville, NC (US)

( * ) Notice: Subject to any disclaimer, the term of this patent is extended or adjusted under 35 U.S.C. 154(b) by 0 days.

(21) Appl. No.: 17/482,736

(22) Filed: Sep. 23, 2021

(65) Prior Publication Data
US 2022/0099848 A1    Mar. 31, 2022

Related U.S. Application Data (60) Provisional application No. 63/085,400, filed on Sep. 30, 2020.

(51) Int. Cl.
   *G01T 1/20*    (2006.01)
(52) U.S. Cl.
   CPC .............................. *G01T 1/20188* (2020.05)
(58) Field of Classification Search
   CPC .............................. G01T 1/20188; G01T 1/20
   See application file for complete search history.

(56) References Cited

U.S. PATENT DOCUMENTS

| | | | |
|---|---|---|---|
| 5,149,971 A | 9/1992 | McElhaney et al. | |
| 5,317,158 A | 5/1994 | McElhaney et al. | |
| 2006/0081786 A1* | 4/2006 | Berthold | G01T 1/208 250/370.11 |
| 2007/0087564 A1* | 4/2007 | Speakman | B33Y 10/00 438/674 |
| 2016/0139280 A1* | 5/2016 | Sahu | G01T 3/06 250/390.11 |

FOREIGN PATENT DOCUMENTS

| | | | | |
|---|---|---|---|---|
| EP | 3855218 A1 * | 7/2021 | ......... | G01T 1/20181 |
| JP | 3606855 B2 * | 1/2005 | ............. | B82Y 10/00 |

OTHER PUBLICATIONS

McElhaney et al. "A more rugged ZnS (Ag) alpha scintillation detector" IEEE Transactions on Nuclear Science, 37 (2):868-872 (1990).

McElhaney et al. "A ruggedized ZnS (Ag)/epoxy alpha scintillation detector" Nuclear Instruments and Methods in Physics Research Section A: Accelerators, Spectrometers, Detectors and Associated Equipment, 299(1-3):111-114 (1990).

* cited by examiner

*Primary Examiner* — Kiho Kim
(74) *Attorney, Agent, or Firm* — Myers Bigel, P.A.

(57) ABSTRACT

Described herein are scintillation detectors such as alpha- and beta-particle scintillation detectors along with methods of preparing and using such detectors. The scintillation detector comprises a protective layer including light-blocking nanoparticles.

20 Claims, 3 Drawing Sheets

SCINTILLATION DETECTORS AND METHODS OF PREPARATION AND USE THEREOF

STATEMENT OF GOVERNMENT SUPPORT

This invention was made with government support under HDTRA1-20-P-0014 awarded by the Defense Threat Reduction Agency. The government has certain rights in the invention.

FIELD

The present invention relates to scintillation detectors such as alpha- and beta-particle scintillation detectors along with methods of preparing and using such detectors.

BACKGROUND

Standard alpha- and beta-particle detectors use an aluminized mylar window to block ambient light from reaching the light-sensitive components inside the detector. Inside the detector are scintillators that fluoresce during radiation exposure, emitting visible light that is subsequently detected by a photomultiplier device. To avoid false detections caused by ambient light, the scintillators and photomultipliers must be stored in a light-tight enclosure. The standard mylar windows are transparent to alpha/beta radiation and are optically opaque, but they are extremely fragile. For this reason, the detectors that are currently deployed for field use are highly susceptible to damage. Once the mylar window is broken, the detector must be sent back to the manufacturer for repair.

Conventional detectors are typically windowed with two mylar sheets that are each approximately 2 μm thick. The fragile mylar windows are used because the penetration depth of alpha and beta particles is very short. Thicker windows would stop the particles before they reach the scintillator. Because the mylar is so fragile, routine cleaning procedures or accidental contact with the environment can puncture the window, allowing ambient light to enter the detector and results in erroneous radiation measurements. For example, a common cause of window damage occurs from contact with blades of grass when used in the field.

Figure 1:
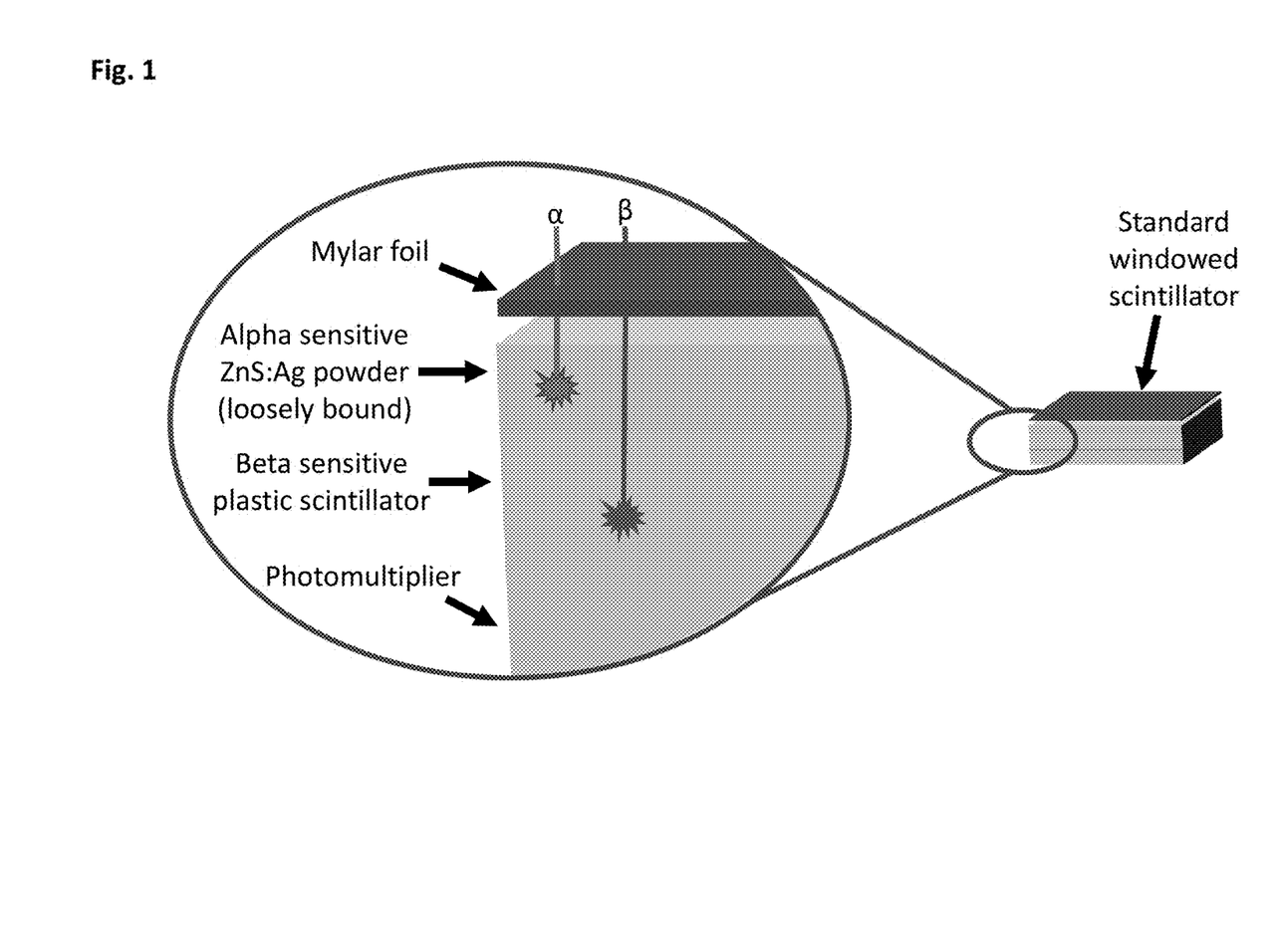
FIG. 1 is a schematic of a conventional windowed alpha/beta detector.

Standard scintillation detectors that are sensitive to both alpha- and beta-particles are often composed of four layers, as illustrated in FIG. 1. The topmost layer is usually a self-supporting fragile foil (e.g., mylar foil) meant to block out ambient light from the underlying photosensitive layers. Underneath the foil is an alpha particle sensitive layer, composed of silver-activated zinc sulfide (ZnS:Ag) powder. The powder is loosely adhered to a beta-particle sensitive layer such as a plastic scintillator. This stack is optically coupled to a photomultiplier tube or silicon photomultiplier to convert the scintillation light to an electrical signal.

SUMMARY

A first aspect of the present invention is directed to a scintillation detector comprising: a protective layer including light-blocking nanoparticles; an alpha-particle sensitive layer; and a photomultiplier.

Another aspect of the present invention is directed to a method of forming a scintillation detector, the method comprising: depositing a light-blocking composition comprising light-blocking nanoparticles on a photomultiplier to provide a deposited light-blocking composition; and forming a protective layer from the deposited light-blocking composition.

A further aspect of the present invention is directed to a method of detecting radiation, the method comprising: exposing a scintillation detector of the present invention to an environment; and detecting a signal (e.g., an electrical signal) from the photomultiplier of the scintillation detector, thereby detecting radiation in the environment.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EXAMPLE EMBODIMENTS

The present invention is now described more fully hereinafter in which embodiments of the invention are described. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

The term "about," as used herein when referring to a measurable value such as an amount or concentration and the like, is meant to encompass variations of ±10%, ±5%, ±1%, ±0.5%, or even±0.1% of the specified value as well as the specified value. For example, "about X" where X is the measurable value, is meant to include X as well as variations of ±10%, ±5%, ±1%, ±0.5%, or even±0.1% of X. A range provided herein for a measurable value may include any other range and/or individual value therein.

As used herein, the terms "increase," "increases," "increased," "increasing," and similar terms indicate an elevation in the specified parameter or value of at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more.

As used herein, the terms "reduce," "reduces," "reduced," "reduction," "inhibit," and similar terms refer to a decrease in the specified parameter or value of at least about 5%, 10%, 15%, 20%, 25%, 30%, 35%, 40%, 45%, 50%, 55%, 60%, 65%, 70%, 75%, 80%, 85%, 90%, 95%, 97%, or 100%.

Figure 2:
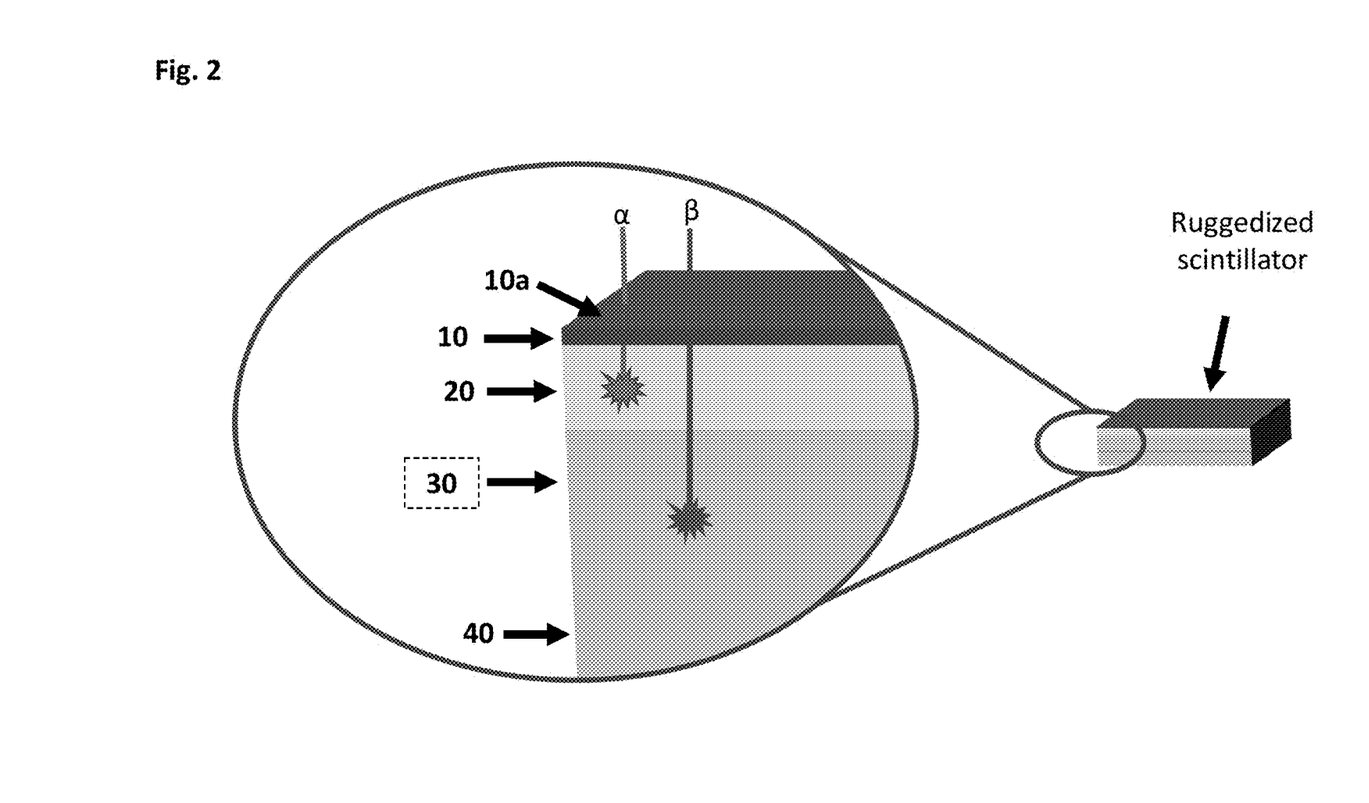
FIG. 2 is a schematic of an exemplary scintillation detector according to embodiments of the present invention.

Provided according to embodiments of the present invention are scintillation detectors. A "scintillation detector" as used herein refers to a device that detects radiation using scintillation. A scintillation detector may detect radiation such as alpha particles, beta particles, neutrons, and/or gamma particles. In some embodiments, a scintillation detector of the present invention detects alpha particles. In some embodiments, a scintillation detector of the present invention detects alpha particles and beta particles. A scintillation detector of the present invention may comprise a protective layer, an alpha-particle sensitive layer, and a photomultiplier. In some embodiments, a scintillation detector includes a beta-particle sensitive layer. FIG. 2 shows an exemplary scintillation detector 100 of the present invention that comprises a protective layer 10, an alpha particle sensitive layer 20, optionally a beta particle sensitive layer 30, and a photomultiplier 40. Surface 10a of the protective layer 10 may be exposed to the environment in that the surface 10a of the protective layer 10 is exposed to ambient light and/or air with no element contacting and/or covering the surface 10a.

The protective layer of the scintillation detector may include light-blocking nanoparticles. A "nanoparticle" as used herein refers to a particle having a diameter of at least 1 nm and less than 1000 nm. A "light-blocking nanoparticle" as used herein refers to a nanoparticle that can block and/or attenuate the transmission of at least a portion of light such as light having a wavelength in a range of about 350, 400, 450, or 500 nm to about 550, 600, 650, or 700 nm from passing (e.g., transmitting) through the nanoparticle. In some embodiments, a light-blocking nanoparticle blocks and/or attenuates the transmission of about 80% or more of ambient light and/or light having a wavelength in a range of about 350, 400, 450, or 500 nm to about 550, 600, 650, or 700 nm from passing through the nanoparticle. In some embodiments, a light-blocking nanoparticle blocks and/or attenuates the transmission of at least 80%, 81%, 82%, 83%, 84%, 85%, 86%, 87%, 88%, 89%, 90%, 91%, 92%, 93%, 94%, 95%, 96%, 97%, 98%, 99%, 99.5%, 99.9%, 99.95%, 99.99%, 99.995%, 99.999%, or more of ambient light and/or light having a wavelength in a range of about 350, 400, 450, 500 nm to about 550, 600, 650, or 700 nm from passing through the nanoparticle. In some embodiments, a plurality of light-blocking nanoparticles are present in the protective layer of the scintillation detector in an amount sufficient to block and/or attenuate the transmission of at least 99%, 99.5%, 99.9%, 99.95%, 99.99%, 99.995%, 99.999%, or more of ambient light and/or light having a wavelength in a range of about 350, 400, 450, 500 nm to about 550, 600, 650, or 700 nm from passing through the protective layer. In some embodiments, a plurality of light-blocking nanoparticles and/or protective layer of the present invention block and/or attenuate the transmission of at least 99%, 99.5%, 99.9%, 99.95%, 99.99%, 99.995%, 99.999%, or more of light having a wavelength that the photomultiplier of the scintillation device is sensitive to (e.g., light having a wavelength in a range of about 350 nm to about 600 nm) such as light having a wavelength that could cause the photomultiplier to generate an electrical signal in error and/or to provide a false positive. In some embodiments, the protective layer blocks and/or attenuates the transmission of at least 99%, 99.5%, 99.9%, 99.95%, 99.99%, 99.995%, 99.999%, or 100% of ambient light and/or light having a wavelength in a range of about 350, 400, 450, 500 nm to about 550, 600, 650, or 700 nm from passing through the protective layer. The light-blocking nanoparticles and/or protective layer may block and/or attenuate light by absorption and/or reflection (e.g., by absorption of at least a portion of the light and/or by reflecting at least a portion of the light). In some embodiments, the protective layer is opaque and/or prevents at least about 99.99% of ambient light and/or light having a wavelength in a range of about 350, 400, 450, 500 nm to about 550, 600, 650, or 700 nm from passing through the protective layer.

A light-blocking nanoparticle and/or a protective layer of the present invention may minimally attenuate incident radiation. For example, a minimal amount of alpha particle energy and/or beta particle energy may be lost by incident radiation traveling through the light-blocking nanoparticle and/or protective layer. In some embodiments, less than about 50% (e.g., less than about 40%, 30%, 20%, 10%, 5%, 1% or less) of alpha particle energy and/or beta particle energy is lost for a respective alpha particle and/or beta particle traveling through a light-blocking nanoparticle and/or protective layer of the present invention. In some embodiments, the light-blocking nanoparticles and/or protective layer may selectively allow for radiation (e.g., alpha particles, beta particles, neutrons, and/or gamma particles) to transmit through the light-blocking nanoparticles and/or protective layer, and/or the light-blocking nanoparticles and/or protective layer may be at least partially nontransmissive for visible light and/or light having a wavelength in a range of about 350 nm to about 700 nm. In some embodiments, the light-blocking nanoparticle and/or protective layer may have a low stopping power such as a stopping power in that a 5.5 MeV alpha particle will lose all energy and stop traveling completely upon traveling about 10, 11, 12, 13, 14, 15, 16, 17, 18, 19, 20, 21, 22, 23, 24, 25, 26, 27, 28, 29, or 30 μm through the light-blocking nanoparticle and/or protective layer. The light-blocking nanoparticle and/or protective layer may be opaque. The protective layer may be configured to allow alpha particles and/or beta particles to pass through the protective layer. Exemplary light-blocking nanoparticles include, but are not limited to, nanoparticles including carbon, boron, lithium, and/or beryllium; zinc oxide nanoparticles; titanium oxide nanoparticles; iron nanoparticles; nickel nanoparticles; iron oxide nanoparticles; aluminum oxide nanoparticles; copper oxide particles; and/or metal nanoparticles (e.g., aluminum nanoparticles). In some embodiments, the light-blocking nanoparticle is a carbon nanoparticle (e.g., carbon black nanoparticles, carbon nanotubes and graphene derivatives thereof, etc.).

In some embodiments, a light-blocking nanoparticle has a diameter that is less than the thickness of the protective layer such as a diameter that is less than the thickness of the protective layer by about 10%, 20%, 30%, 40%, 50%, 60%, 70%, 80%, 90%, 100%, 150%, 200%, 300%, 400%, 500%, or more. In some embodiments, a light-blocking nanoparticle has a diameter that is less than the thickness of the protective layer by about 2×, 3×, 4×, 5×, 6×, 7×, 8×, 9×, 10×, 11×, 12×, 13×, 14×, or 15×. In some embodiments, the light-blocking nanoparticle has a diameter that at least about 10× smaller than the thickness of the protective layer. The light-blocking nanoparticle may have a diameter of about 10, 25, 50, 75, 100, 150, 200, or 250 nm to about 300, 350, 400, 450, 500, 550, or 600 nm.

Light-blocking nanoparticles may be present in the protective layer in a concentration in a range of about 10%, 15%, 20%, 25%, 30%, 35%, 40%, or 45% to about 50%, 55%, 60%, 65%, 70%, 75%, 80%, 85%, or 90% by weight of the protective layer. In some embodiments, light-blocking nanoparticles are present in the protective layer in a concentration in a range of about 10%, 15%, 20%, 25%, 30%, 35%, 40%, 45%, 50%, 55%, 60%, 65%, 70%, 75%, 80%, 85%, or 90% by weight of the protective layer. In some embodiments, a light-blocking nanoparticle having a surface area that is greater than another light-blocking nanoparticle may be provided in a protective layer at a lower concentration than the concentration for the light-blocking nanoparticle having a smaller surface area may be provided in a protective layer. For example, a light-blocking nanoparticle having a diameter of about 200 nm may be present in the protective layer in an amount of less than about 50% by weight of the protective layer, whereas a light-blocking nanoparticle having a diameter of about 20 nm may be present in the protective layer in an amount of about 50% by weight of the protective layer or more, optionally due to the 20 nm nanoparticle having less surface area. In some embodiments, a light-blocking nanoparticle may have a surface area in a range of about 500, 1,000, 5,000, or 10,000 $nm^2$ to about 25,000, 50,000, 100,000, 150,000, 200,000, 300,000, or 400,000 $nm^2$. In some embodiments, light-blocking nanoparticles are provided in the protective layer at a concentration sufficient to block the transmission of at least 99%, 99.5%, 99.9%, 99.95%, 99.99%, 99.995%, 99.999%, or more of ambient light and/or light having a wavelength in a range of about 350, 400, 450, 500 nm to about 550, 600, 650, or 700 nm from passing through the protective layer.

In addition to light-blocking nanoparticles, the protective layer may include a binder. Exemplary binders include, but are not limited to, epoxies. An epoxy is a polymer that is formed from a hardener and a compound that includes at least one epoxide group per unit (e.g., per monomer unit). The compound that includes at least one epoxide group per unit may comprise an ethylene oxide and/or a propylene oxide. The hardener may comprise a nitrogen atom, a cyano group, an amine group, and/or an acidic hydroxyl group (e.g., from a compound comprising an aliphatic diol, polyol, phenol, carboxylic acid, etc.). In some embodiments, the epoxy may be a glycidyl-based epoxy, a bisphenol resin (e.g., a bisphenol A-based resin, bisphenol F-based resin, brominated bisphenol resin, etc.), a novolak resin, an aliphatic epoxy resin (e.g., cycloaliphatic epoxy resin), a halogenated epoxy resin (e.g., a brominated epoxy resin and/or fluorinated epoxy resin), a glycidyl amine epoxy resin, and any combination thereof. In some embodiments, the protective layer comprises a chemically cured epoxy comprising a polyester, phenolic, polycarbonate, polyamide, polyurethane, polyethylene, polystyrene and/or polypropylene resin. In some embodiments, an epoxy has a Shore D hardness in a range of about 60, 65, 70, 75, or 80 to about 85, 90, 95, or 100, optionally as measured in accordance with ASTM D2240. In some embodiments, an epoxy has a Shore D hardness of at least about 80, optionally as measured in accordance with ASTM D2240. In some embodiments, an epoxy has a Shore D hardness of about 60, 65, 70, 75, 80, 85, 90, 95, or 100, optionally as measured in accordance with ASTM D2240. In some embodiments, a mixed epoxy (i.e., a mixture of the hardener and the compound including at least one epoxide group per unit), prior to curing, has a viscosity in a range of about 50, 100, 250, or 500 cP to about 750, 1,000, 1,500, 2,000, 2,500, 3,000, 3,500, or 4,000 cP, optionally as measured in accordance with ASTM D2196. In some embodiments, a mixed epoxy, prior to curing, has a viscosity of about 50, 100, 250, 500, 750, 1,000, 1,500, 2,000, 2,500, 3,000, 3,500, or 4,000 cP, optionally as measured in accordance with ASTM D2196. In some embodiments, the binder (e.g., an epoxy) is optically transparent. In some embodiments, the binder (e.g., an epoxy) is not optically transparent.

The protective layer may comprise a plurality of light-blocking nanoparticles that are dispersed in the binder and/or throughout the protective layer. In some embodiments, light-blocking nanoparticles are suspended in the binder and/or the protective layer. The light-blocking nanoparticles may be uniformly dispersed and/or suspended in the binder and/or the protective layer such that substantially the same amount (e.g., within ±10%) of light-blocking nanoparticles are present in two or more different equal areas of the protective layer.

The protective layer may have a thickness of about 7 µm or less such as about 6.5, 6, 5.5, 5, 4.5, 4, 3.5, 3, 2.5, 2, 1.5, 1, or 0.5 µm or less. In some embodiments, the protective layer has a thickness of about 0.5, 1, 1.5, 2, 2.5, 3, 3.5, 4, 4.5, 5, 5.5, 6, 6.5, or 7 µm. In some embodiments, the protective layer has a thickness of about 0.5, 1, 1.5, 2, 2.5, or 3 µm to about 3.5, 4, 4.5, 5, 5.5, 6, 6.5, or 7 µm.

As shown, for example, in FIG. 2, the protective layer 10 may be in direct contact with the alpha-particle sensitive layer 20 (i.e., a surface of the protective layer 10 contacts a surface of the alpha-particle sensitive layer with no intervening elements) and the alpha-particle sensitive layer 20 may be between the protective layer 10 and the photomultiplier 40. The alpha-particle sensitive layer may have a thickness of about 1, 2, 3, 4, 5, 6, 7, 8, 9, or 10 µm to about 11, 12, 13, 14, 15, 16, 17, 18, 19, 20, 21, 22, 23, 24, 25, 26, 27, 28, 29, or 30 µm. In some embodiments, the alpha-particle sensitive layer has a thickness of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 µm.

Figure 3:
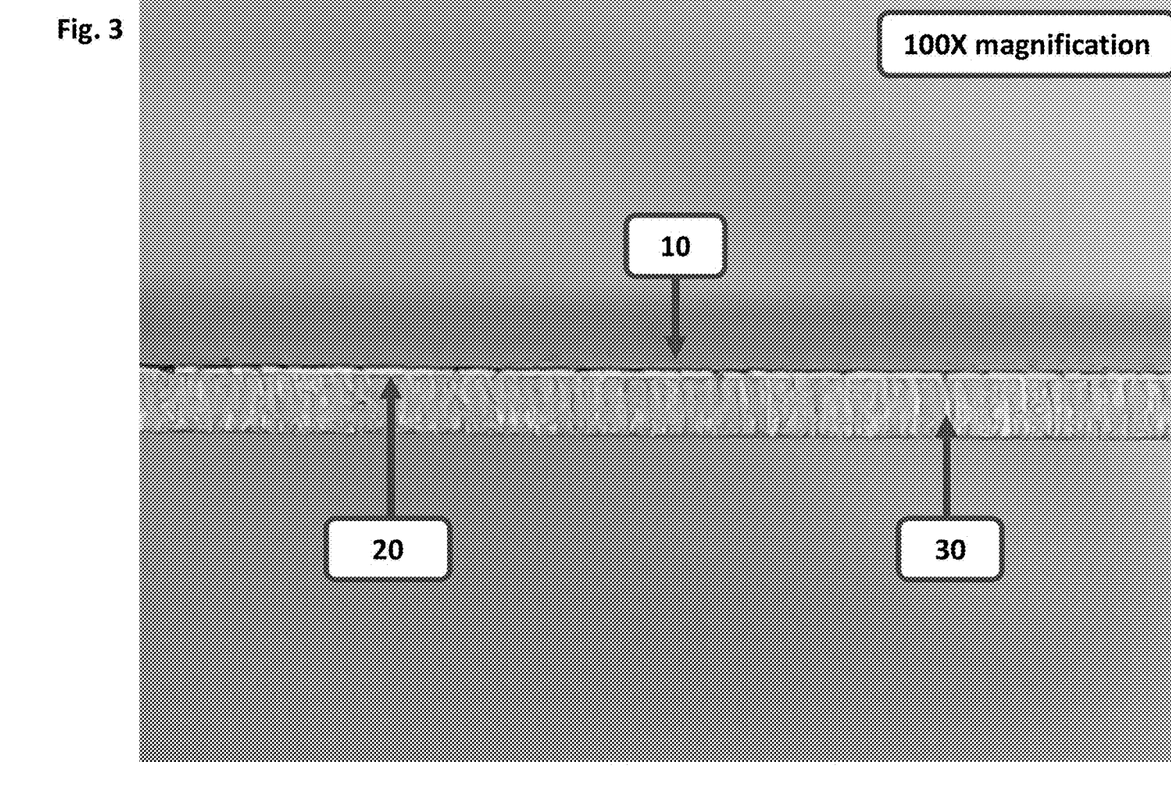
FIG. 3 is a microscope image at 1000× magnification of a cross section of a portion of an exemplary scintillation detector according to embodiments of the present invention.

In some embodiments, the total thickness of the protective layer and the alpha-particle sensitive layer together may be about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 µm. In some embodiments, the total thickness of the protective layer and the alpha-particle sensitive layer together may be in a range of about 10, 11, 12, 13, 14, or 15 µm to about 16, 17, 18, 19, 20, 21, 22, 23, 24, 25, 26, 27, 28, 29, 30, 31, 32, 33, 34, 35, 36, 37, 38, 39, or 40 µm. FIG. 3 shows exemplary thicknesses of a protective layer 10, alpha-particle sensitive layer 20, and beta-particle sensitive layer 30 for a scintillation detector of the present invention.

The alpha-particle sensitive layer may comprise silver-activated zinc sulfide (ZnS:Ag). The ZnS:Ag may be present in an epoxy present in the alpha-particle sensitive layer. In some embodiments, ZnS:Ag (e.g., a ZnS:Ag powder and/or ZnS:Ag particles) is dispersed in an epoxy and/or throughout the alpha-particle sensitive layer. In some embodiments, ZnS:Ag (e.g., a ZnS:Ag powder and/or ZnS:Ag particles) is suspended in an epoxy and/or the alpha-particle sensitive layer. ZnS:Ag may be uniformly dispersed and/or suspended in an epoxy such that substantially the same amount (e.g., within ±10%) of ZnS:Ag is present in two or more different equal areas of the alpha-particle sensitive layer. ZnS:Ag may be present in the alpha-particle sensitive layer in a concentration in a range of about 50%, 55%, or 60% to about 65%, 70%, 75%, 80%, 85%, 90%, or 95% by weight of the alpha-particle sensitive layer. In some embodiments, ZnS:Ag may be present in the alpha-particle sensitive layer in a concentration of about 50%, 55%, 60%, 65%, 70%, 75%, 80%, 85%, 90%, or 95% by weight of the alpha-particle sensitive layer.

The epoxy present in the alpha-particle sensitive layer may be the same as or different than an epoxy present in the protective layer. In some embodiments, the same epoxy is present in the alpha-particle sensitive layer and the protective layer. In some embodiments, a different epoxy is present in the alpha-particle sensitive layer than the protective layer. In some embodiments, the alpha-particle sensitive layer comprises a chemically cured epoxy comprising a polyester, phenolic, polycarbonate, polyamide, polyurethane, polyethylene, polystyrene and/or polypropylene resin. The epoxy present in the alpha-particle sensitive layer may be optically transparent. "Optically transparent" as used herein refers to the transmission of at least about 95% of light having a wavelength in a range of about 400-600 nm through a material (e.g., a layer, epoxy, etc.).

In some embodiments, the scintillation detector comprises a beta-particle sensitive layer. The beta-particle sensitive layer may be between the alpha-particle sensitive layer and the photomultiplier and/or the beta-particle sensitive layer may be in direct contact with the photomultiplier and/or alpha-particle sensitive layer. The alpha-particle sensitive layer and, when present, the beta-particle sensitive layer is/are optically coupled to the photomultiplier. The beta-particle sensitive layer may be a beta-particle sensitive plastic scintillator.

In some embodiments, the photomultiplier may be a photomultiplier tube or silicon photomultiplier. The photomultiplier of the present invention is configured to convert scintillation light (e.g., visible light produced by a scintillator) to an electrical signal. The photomultiplier is configured to detect scintillation light (e.g., luminescence) produced by the alpha-particle sensitive layer and/or beta-particle sensitive layer. For example, the alpha-particle sensitive layer or beta-particle sensitive layer, when excited by an alpha particle or a beta particle, respectively, may emit light (e.g., luminesce) optionally having a wavelength in the range of about 400 nm to about 500 nm and the photomultiplier may detect the light having a wavelength in a range of about 400 nm to about 500 nm. In some embodiments, the alpha-particle sensitive layer and/or beta-particle sensitive layer, upon excitation, emit light having a wavelength in a range of about 400 nm to about 500 nm and the photomultiplier is configured to detect this light and convert it to an electrical signal.

A scintillation detector of the present invention may have increased durability compared to a scintillation detector comprising a mylar window such as shown in FIG. 1. In scintillation detectors including a mylar window, typically the mylar is not physically attached to the scintillator, but is instead held in frame (e.g., like a window). A scintillation detector of the present invention and/or the protective layer of the scintillation detector of the present invention may be devoid of polyethylene terephthalate (PET) (e.g., aluminized PET such as mylar) and/or may comprise a protective layer that is physically attached (e.g., bonded and/or glued) to the alpha-particle sensitive layer. Scintillation detectors including a mylar window can easily be damaged such as by being contacted with a blade of grass. In contrast, a scintillation detector and/or protective layer of the present invention may not be damaged by contact with a blade of grass and/or by forcefully stabbing, scraping, and/or striking the protective layer with a sharp metal tool. Since a surface of the protective layer of the scintillation detector of the present invention is exposed to the environment (e.g., surface 10a of the protective layer 10) increased durability is a significant improvement over scintillation detectors including a mylar window.

A scintillation detector of the present invention may have an efficiency, sensitivity, and/or accuracy in detecting radiation (e.g., alpha and/or beta particles) that is substantially the same (e.g., within ±10%) as the efficiency, sensitivity, and/or accuracy of scintillation detectors including a mylar window. In some embodiments, a scintillation detector of the present invention may have an increased efficiency, sensitivity, and/or accuracy in detecting radiation (e.g., alpha and/or beta particles) than the efficiency, sensitivity, and/or accuracy of scintillation detectors including a mylar window.

A scintillation detector of the present invention may have one or more (e.g., 1, 2, 3, 4, or more) advantageous properties and optionally the one or more advantageous properties may not be present for a scintillation detector including a mylar window. For example, a protective layer and/or scintillation detector of the present invention may be waterproof, resistant to a solvent such as an organic solvent (e.g., an alcohol and/or acetone), and/or unaffected by a disinfecting solution (e.g., a mixture of 5% bleach and 95% water). Resistance to a solvent may be determined by contacting the protective layer and a solvent and then determining whether any light blocking nanoparticles were removed from the protective layer due to contact with the solvent. For example, the protective layer may be wiped with a cloth (e.g., a white cloth) comprising the solvent (e.g., a cloth contacted with and/or soaked with the solvent) and determining, after contacting the cloth and protective layer, whether the cloth comprises any light blocking nanoparticles. For carbon nanoparticles this may be determined visually by the presence of black soot on the cloth. Exemplary solvents that a protective layer and/or scintillation detector of the present invention may be resistant to include, but are not limited to, water, ethyl alcohol, isopropyl alcohol, denatured alcohol, bleach, an aqueous bleach composition (e.g., a composition comprising 5% bleach and 95% water), and/or acetone.

According to embodiments of the present invention, provided are methods of forming a scintillation detector. A method of the present invention may comprise depositing a light-blocking composition comprising light-blocking nanoparticles and optionally a binder (e.g., an epoxy) on a photomultiplier to provide a deposited light-blocking composition on the photomultiplier and forming a protective layer from the deposited light-blocking composition. The light-blocking composition may be provided by combining (e.g., mixing) light-blocking nanoparticles and a binder (e.g., an epoxy) to form the light-blocking composition. Forming the protective layer from the deposited light-blocking composition may comprise curing the deposited light-blocking composition for a period of time such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 hours or more, optionally at room temperature and/or atmosphere and/or at a temperature of about 20° C. to about 25° C. and/or about 1 atm. In some embodiments, the deposited light-blocking composition is cured for a period of time in a range of about 1, 2, 3, 4, 5, or 6 hours to about 7, 8, 9, 10, 11, 12, 13, 14, 15, 16, 17, 18, 19, 20, 21, 22, 23, 24, 25, 26, 27, 28, 29, or 30 hours or more, optionally at room temperature and/or atmosphere and/or at a temperature of about 20° C. to about 25° C. and/or about 1 atm.

In some embodiments, the light-blocking composition is deposited directly onto a surface of an alpha-particle sensitive layer. The deposited light-blocking composition may have a thickness of about 45 μm or less. In some embodiments, the deposited light-blocking composition has a thickness of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 μm. Deposition methods are known to those of skill in the art. Exemplary deposition techniques that may be used in a method of the present invention include, but are not limited to, doctor blading, spin coating, spray coating, mist coating, screen printing, and/or dip coating. In some embodiments, the light-blocking composition is deposited using a thick film deposition technique. Exemplary thick film deposition techniques include, but are not limited to, doctor blading and/or spin coating.

In some embodiments, prior to depositing the light-blocking composition, an alpha-particle sensitive layer is provided on the photomultiplier. The alpha-particle sensitive layer may be provided and/or formed from a ZnS:Ag composition comprising ZnS:Ag. The ZnS:Ag composition may be provided by combining (e.g., mixing) ZnS:Ag powder and an epoxy to form the ZnS:Ag composition. In some embodiments, a ZnS:Ag composition may be deposited on the photomultiplier and an alpha-particle sensitive layer is formed from the deposited ZnS:Ag composition. In some embodiments, the ZnS:Ag composition is deposited using a thick film deposition technique such as doctor blading and/or spin coating. The deposited ZnS:Ag composition may have a thickness of about 35 μm or less. In some embodiments, the deposited ZnS:Ag composition has a thickness of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 μm.

Forming the alpha-particle sensitive layer from the deposited ZnS:Ag composition may comprise curing the deposited ZnS:Ag composition for a period of time such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 hours or more, optionally at room temperature and/or atmosphere and/or at a temperature of about 20° C. to about 25° C. and/or about 1 atm. In some embodiments, the deposited ZnS:Ag composition is cured for a period of time in a range of about 1, 2, 3, 4, 5, or 6 hours to about 7, 8, 9, 10, 11, 12, 13, 14, 15, 16, 17, 18, 19, 20, 21, 22, 23, 24, 25, 26, 27, 28, 29, or 30 hours or more, optionally at room temperature and/or atmosphere and/or at a temperature of about 20° C. to about 25° C. and/or about 1 atm.

A scintillation detector of the present invention may be used to detect radiation (e.g., alpha, beta, and/or gamma radiation and/or neutrons). In some embodiments, a method of detecting radiation comprises exposing the scintillation detector to an environment and detecting a signal (e.g., an electrical signal) from the photomultiplier of the scintillation detector, thereby detecting radiation in the environment. The environment may be air, water, soil, land, a building (e.g., hospital and/or a room thereof (e.g., a surgery room)), and/or a subject. The subject may be an animal (e.g., dog, horse, rat, etc.) and/or a human and radiation may be present on and/or in the subject.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

EXAMPLES

Example 1

A protective layer and alpha-particle sensitive layer will be produced on a beta-particle sensitive layer using doctor blading as shown in FIG. 3.

A beta sensitive plastic scintillator sheet will be placed on a vacuum chuck to prevent it from moving. ZnS:Ag and an epoxy resin will be heated in an oven at 140° F. to lower the viscosity of the ZnS:Ag/resin mixture. The ZnS:Ag/resin mixture will be mixed together by hand in a weigh boat. A hardener will be added to the ZnS:Ag/resin mixture and mixed again. The resulting ZnS:Ag/epoxy mixture will be poured onto the plastic scintillator, and a mechanical arm will move a film applicator (e.g., a piece of metal with a precision gap in it) across the scintillator. This will spread out the ZnS:Ag/epoxy mixture into a layer the thickness of the film applicator gap and the width of the film applicator across the plastic scintillator sheet. After the ZnS:Ag/epoxy layer has cured to provide the alpha-particle sensitive layer, the process will be repeated to provide a protective layer such as one including carbon nanoparticles and an epoxy on top of the alpha-particle sensitive layer, only the carbon nanoparticles and epoxy resin would be mixed in a vacuum mixer instead of by hand to decrease air bubbles and pinholes in the protective layer. In addition, the mixture including carbon nanoparticles and epoxy will be poured onto a surface of the alpha-particle sensitive layer.

Example 2

A protective layer will be produced on an alpha-particle sensitive layer using spin coating.

A beta-particle sensitive layer and alpha-particle sensitive layer will be provided as described above in Example 1.

The composite including the beta-particle sensitive layer and alpha-particle sensitive layer will be adhered to a spin coater chuck with double sided tape with the surface of the alpha-particle sensitive layer facing up. Carbon nanoparticles and an epoxy resin will be heated in the oven to 140 F. The carbon nanoparticles and epoxy resin will be mixed in a vacuum mixer to provide a carbon/resin mixture. A hardener will be added to the carbon/resin mixture and mixed in. The resulting carbon/epoxy mixture will be generously dolloped onto the surface of the alpha-particle sensitive layer of the composite and spread semi-uniformly across the surface. The spin coater will be turned on to about 2000 RPM, and all the excess carbon/epoxy mixture will be spun off, leaving a thin layer on the surface that is allowed to cure to provide the protective layer.

The foregoing is illustrative of the present invention, and is not to be construed as limiting thereof. The invention is defined by the following claims, with equivalents of the claims to be included therein.

That which is claimed is:

1. A scintillation detector comprising:
   a protective layer including light-blocking nanoparticles;
   a radiation-sensitive scintillating layer; and
   a photomultiplier,
   wherein the protective layer is configured to allow alpha-particles and/or beta-particles to pass through and the protective layer prevents at least 99% of ambient light from reaching the radiation-sensitive scintillating layer.

2. The scintillation detector of claim 1, wherein the light blocking nanoparticles are carbon nanoparticles.

3. The scintillation detector of claim 1, wherein the protective layer further comprises a binder.

4. The scintillation detector of claim 3, wherein the light-blocking nanoparticles are dispersed in the binder.

5. The scintillation detector of claim 1, wherein the protective layer has a thickness of about 5 μm or less.

6. The scintillation detector of claim 1, wherein the protective layer is adhered to the radiation-sensitive scintillating layer.

7. The scintillation detector of claim 1, wherein the radiation-sensitive scintillating layer comprises a beta-particle sensitive layer.

8. The scintillation detector of claim 7, wherein the radiation-sensitive scintillating layer further comprises an alpha-particle sensitive layer and the beta-particle sensitive layer is between the alpha-particle sensitive layer and the photomultiplier.

9. The scintillation detector of claim 1, wherein the protective layer is devoid of polyethylene terephthalate (PET).

10. The scintillation detector of claim 1, wherein the radiation-sensitive scintillating layer comprises silver-activated zinc sulfide (ZnS:Ag).

11. The scintillation detector of claim 1, wherein the radiation-sensitive scintillating layer has a thickness of about 10 μm to about 30 μm.

12. The scintillation detector of claim 1, wherein the radiation-sensitive scintillating is optically coupled to the photomultiplier.

13. The scintillation detector of claim 1, wherein the protective layer is not damaged by contact with a blade of grass.

14. The scintillation detector of any claim 1, wherein the protective layer is waterproof, resistant to an organic solvent, and/or unaffected by a disinfecting solution.

15. A method of detecting radiation, the method comprising:
   exposing the scintillation detector of claim 1 to an environment; and
   detecting a signal from the photomultiplier of the scintillation detector, thereby detecting radiation in the environment.

16. The method of claim 15, wherein the radiation comprises alpha particles and/or beta particles.

17. The scintillation detector of claim 1, wherein the radiation-sensitive scintillating layer comprises an alpha-particle sensitive layer.

18. A method of forming a scintillation detector, the method comprising:
   depositing a light-blocking composition comprising light-blocking nanoparticles on a radiation-sensitive scintillating layer that is on a photomultiplier to provide a deposited light-blocking composition; and
   forming a protective layer from the deposited light-blocking composition,
   wherein the protective layer is configured to allow alpha-particles and/or beta-particles to pass through and the protective layer prevents at least 99% of ambient light from reaching the radiation-sensitive scintillating layer.

19. The method of claim 18, wherein depositing the light-blocking composition comprises depositing the light-blocking composition using a thick film deposition technique.

20. A scintillation detector comprising:
a protective layer including light-blocking nanoparticles wherein the protective layer has a thickness of about 5 μm or less;
a radiation-sensitive scintillating layer; and
a photomultiplier,
wherein the protective layer is adhered to the radiation-sensitive scintillating layer.

* * * * *